G. B. KELLEY.
CUSHION SPRING FOR THREE WHEELED TRACTORS.
APPLICATION FILED NOV. 19, 1915.
1,239,603.
Patented Sept. 11, 1917.
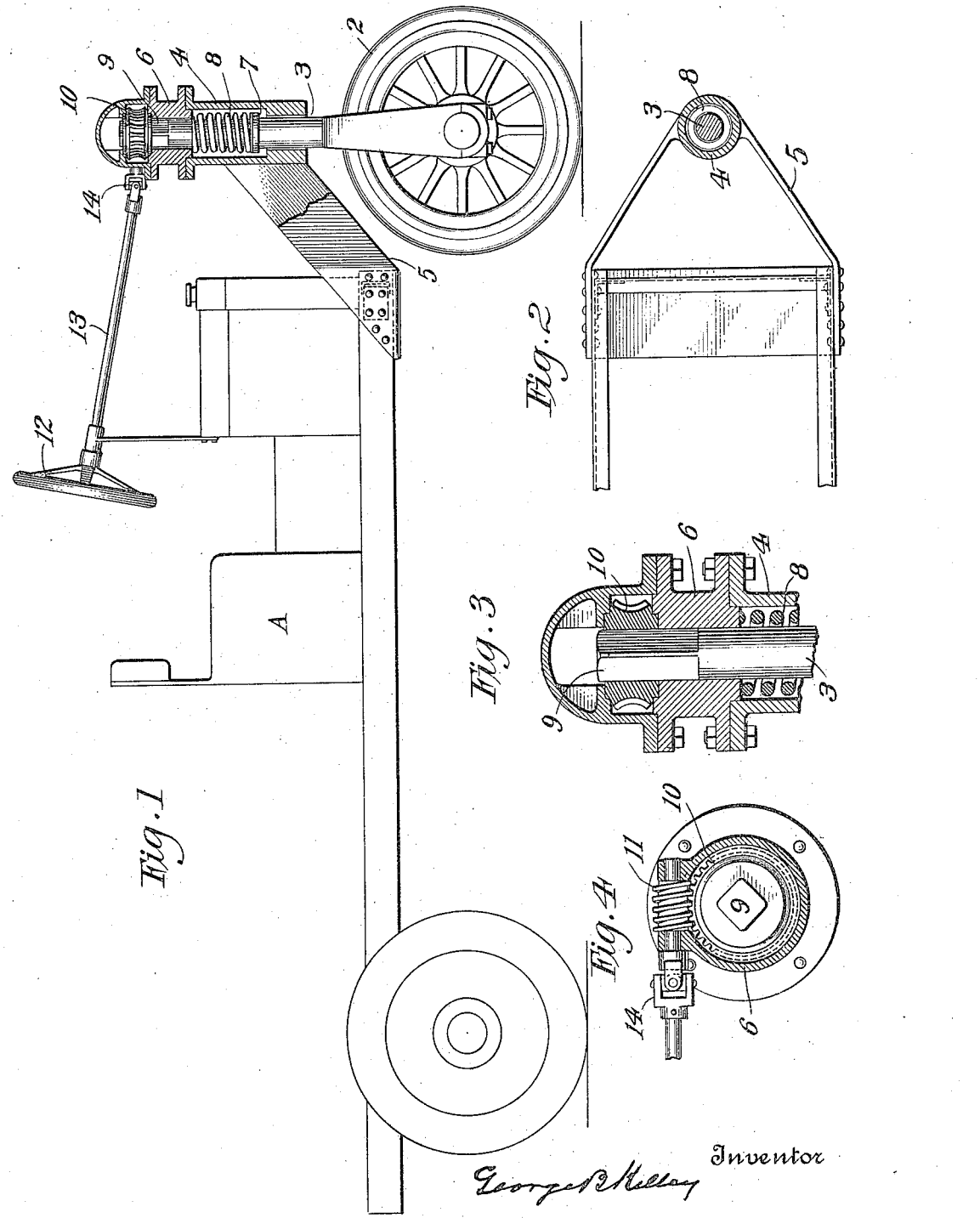

UNITED STATES PATENT OFFICE.

GEORGE B. KELLEY, OF FLUSHING, NEW YORK, ASSIGNOR TO TRANSPORT TRACTOR COMPANY, INC., OF LONG ISLAND CITY, NEW YORK, A CORPORATION OF NEW YORK.

CUSHION-SPRING FOR THREE-WHEELED TRACTORS.

1,239,603.  Specification of Letters Patent.  Patented Sept. 11, 1917.

Application filed November 19, 1915. Serial No. 62,375.

*To all whom it may concern:*

Be it known that I, GEORGE B. KELLEY, a citizen of the United States, residing in Flushing, county of Queens, and State of New York, have invented certain new and useful Improvements in Cushion-Springs for Three-Wheeled Tractors, of which the following is a specification.

My invention relates to improvements in three wheel automobile tractors, its object being to provide a cushion spring for the post of the lead wheel, and consists in the features of construction hereinafter shown, described, and claimed.

In the drawings, forming part of this specification, Figure 1 is a diagrammatic side elevation of a tractor with my improved form of guide post and cushioning spring, parts being broken away to show the interior construction;

Fig. 2 is a detail plan view of the forward part of the frame showing the bracket for holding the post;

Fig. 3 is a detail vertical section of the post and the worm gear;

Fig. 4 is a cross section showing the worm and worm gear.

Referring now to the drawings, A represents the tractor body, 2 the lead wheel, 3 the post for the same, 4 the casing in which the post turns, which post is held and supported by the bracket 5 forming part of the frame of the tractor. 6 is the hub in which the post 3 is free to turn and slide. This post has a collar or shoulder 7 which serves as a support for the cushion spring 8, the top of which abuts against the hub 6. The top 9 of the post 3 is of angular form, preferably square, on which is slidably mounted the worm gear 10, with which the worm 11 engages and which is operated by means of the hand wheel 12 on its shaft 13 and having the universal joint connection 14.

From the construction shown the operation is obvious. The spring 8 cushions the shocks of the wheel caused by the obstacles in travel, the post sliding through the hub 6 and the worm gear without interfering with the operation of the hand wheel 12, and the connected gearing.

Having thus described my invention, what I claim and desire to secure by Letters Patent is:

1. In an automobile tractor of the class described, the combination comprising a supporting frame provided with a vertical apertured casing adapted to receive a lead-wheel post vertically slidable with respect to said casing, a cushioning, supporting spring interposed between said frame and said post so as to take up the shocks upon said post, a steering mechanism vertically slidable with respect to said post including a worm slidably mounted on said post, a worm pinion held in fixed vertical relation with respect to said worm, and a driving-wheel connected to said pinion so as to positively rotate the pinion when said driving wheel is rotated, but to permit of movement of said driving wheel transversely with respect to the longitudinal axis of said pinion.

2. In an automobile tractor of the class described, the combination comprising a supporting frame provided with a vertical apertured casing adapted to receive a lead-wheel post vertically slidable with respect to said casing, a cushioning, supporting spring interposed between said frame and said post so as to take up the shocks upon said post, a steering mechanism vertically slidable with respect to said post including a worm slidably mounted on said post, a worm pinion held in fixed vertical relation with respect to said worm, a driving-wheel connected by means of a universal joint to said pinion, adapted to positively rotate the same when said driving wheel is rotated.

In witness whereof, I have hereunto set my hand at Long Island City, in the county of Queens and State of New York, this third day of November, 1915.

GEORGE B. KELLEY.

Copies of this patent may be obtained for five cents each, by addressing the "Commissioner of Patents, Washington, D. C."